US007291951B2

(12) United States Patent
Takiguchi et al.

(10) Patent No.: US 7,291,951 B2
(45) Date of Patent: Nov. 6, 2007

(54) ACTUATOR INCLUDING INTERMEDIATE WALL

(75) Inventors: Tsutomu Takiguchi, Shizuoka (JP); Keiichi Tajima, Shizuoka (JP); Kazuma Mochizuki, Shizuoka (JP); Naoki Takii, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 11/075,262

(22) Filed: Mar. 8, 2005

(65) Prior Publication Data

US 2005/0213339 A1 Sep. 29, 2005

(30) Foreign Application Priority Data

Mar. 10, 2004 (JP) ......................... P. 2004-067084

(51) Int. Cl.
*H02K 7/10* (2006.01)
*H02K 5/00* (2006.01)
*B60Q 1/076* (2006.01)

(52) U.S. Cl. ................ 310/75 R; 310/67 R; 310/68 R; 310/89; 362/272; 362/428

(58) Field of Classification Search .................. 310/89, 310/156.05, 90, 68 R, 83; 362/272, 428
See application file for complete search history.

(56) References Cited

U.S. PATENT DOCUMENTS 3,825,781 A * 7/1974 Woods ........................ 310/90
3,845,334 A * 10/1974 Harada et al. ................ 310/46
5,251,114 A * 10/1993 Cantin et al. ............... 362/286
6,028,384 A * 2/2000 Billman et al. ............... 310/83
6,107,704 A * 8/2000 Wallner et al. ....... 310/40 MM
6,169,345 B1 * 1/2001 Bloch et al. ............. 310/67 R
6,278,207 B1 * 8/2001 Matsumoto .................. 310/88
6,411,006 B2 * 6/2002 Suzuki et al. ............... 310/254
6,617,719 B2 * 9/2003 Sunaga et al. ................ 310/64
6,753,629 B2 * 6/2004 Doi et al. ................. 310/68 D
6,938,511 B2 * 9/2005 Meier et al. .................. 74/425
2002/0064051 A1 5/2002 Sugimoto et al.
2002/0109426 A1 * 8/2002 Peter et al. ................... 310/89
2002/0158524 A1 * 10/2002 Bobay et al. ............. 310/68 R
2003/0213087 A1 * 11/2003 Moein et al. .............. 15/250.3
2004/0108778 A1 * 6/2004 Tsukamoto et al. ........... 310/83
2004/0108779 A1 * 6/2004 Boettger et al. .............. 310/89

FOREIGN PATENT DOCUMENTS

JP 2002-160581 6/2002

* cited by examiner

*Primary Examiner*—Burton Mullins
(74) *Attorney, Agent, or Firm*—Fish & Richardson P.C.

(57) ABSTRACT

An actuator has a housing that accommodates a motor, an output shaft for rotating a lamp unit that radiates light, a drive mechanism portion formed from a transmission gear system for transmitting rotation from the motor to the output shaft, and a control circuit portion for controlling the drive of the motor, the drive mechanism portion and the control circuit portion being disposed in a separated state due to an intermediate wall.

5 Claims, 6 Drawing Sheets

11
11a
11b
11c
11e
11f
10
20
21
21a
21a'
21b
21b'
22
22a
23
24
27
28
28b
31
32
33
34
35
36
37
70
71
72
73
73a
74
75
12
12a
12b
12c
12d
12e 1
10
61
62
21
21a
11f
21a'
11e
12d
22c
12e
22b
25
65
11g
22
62a
63b
11d
11
11c
50
31
23
20
27
73
12a
24
63
12
71
52
37
66
26
62b
36

ACTUATOR INCLUDING INTERMEDIATE WALL

CROSS-REFERENCE

This claims the benefit of Japanese Patent Application No. 2004-67084, filed Mar. 10, 2004, which is incorporated herein in its entirety.

TECHNICAL FIELD

The present invention relates to an actuator. More particularly, the present invention relates to a technology for improving durability of an actuator for rotating a lamp unit in order to change the direction of radiation of a vehicular lamp.

BACKGROUND

In a vehicle, for example, an automobile, the direction of radiation of a lamp is appropriately changed in accordance with the running conditions.

For example, a structure that enables a head lamp unit to be rotated to the left and right directions and an actuator that rotates the lamp unit in the left and right directions may be provided, and when the automobile is turning, the direction of radiation of the lamp unit may be turned.

Unexamined Japanese Patent Publication No. 2002-160581 proposes an actuator for driving a lamp unit in order to achieve this.

The actuator disclosed in Japanese Patent Publication No. 2002-160581 is configured from a motor; an output shaft that rotates the lamp unit; a drive mechanism portion including a transmission gear system that transmits the rotation of the motor to the output shaft; and a control circuit portion that controls the drive of the motor, disposed in a housing. The lamp unit is connected to the output shaft such that, for example, in response to a steering operation, the motor is driven and controlled by the control circuit portion, and, in accordance therewith, the output shaft is rotated by a predetermined angle in a predetermined direction so as to rotate the lamp unit by a predetermined angle in a predetermined direction.

However, in the prior art actuator, the motor, the drive mechanism portion including the gear, and the control circuit portion are disposed within the same space. As a result, a problem has become apparent in that grease, oil, and the like, that are used in the drive mechanism portion adhere to electronic components on the board of the control circuit portion, thus causing deterioration of the circuit. Moreover, other problems occur such as the performance of the structural components of the drive mechanism portion being impaired as a result of cutting debris of the board of the control circuit portion becoming jammed in the gears of the drive mechanism portion.

SUMMARY OF THE INVENTION

One embodiment of an actuator of the present invention solves the above described problems with a configuration in which a drive mechanism portion and a control circuit portion are disposed in a separated state due to an intermediate wall.

Accordingly, with an actuator of the present invention, the intermediate wall inhibits the drive mechanism portion and the control circuit portion from exerting a negative impact on each other.

An actuator of the present invention includes a housing that accommodates a motor; an output shaft that rotates a lamp unit that radiates light; a drive mechanism portion configured from a transmission gear system that transmits rotation from the motor to the output shaft; and a control circuit portion that controls the drive of the motor. The actuator is characterised in that the drive mechanism portion and the control circuit portion are disposed in a separated state due to an intermediate wall.

Accordingly, with the actuator of the present invention, grease, oil, and the like, that is used for the drive mechanism portion is blocked by the intermediate wall and thus do not adhere to a board of the control circuit portion. Moreover, cutting debris of the board of the control circuit portion is blocked by the intermediate wall, and thus does not get jammed in the gears of the drive mechanism portion. As a result, the electronic components on the board of the control circuit portion do not deteriorate due to grease, oil, and the like. Further, performance is not adversely affected by cutting debris of the board of the control circuit portion being jammed in the gears of the drive mechanism portion. Accordingly, desired performance can be fully demonstrated and durability improved.

In a further embodiment of the invention, the intermediate wall is formed so as to divide a space within the housing in the thickness direction of the control circuit use board. The drive mechanism portion is disposed in one side of the divided space, and the control circuit portion is disposed in the other side of the divided space. Accordingly, it is possible to reduce the size of the actuator in the horizontal plane.

In yet a further embodiment, a support shaft for the output shaft and/or for the transmission gear system is formed in the intermediate wall, and thus it is possible to reduce the number of components. Accordingly, cost reduction and production efficiency can both be improved.

In another embodiment, the intermediate wall is formed integrally with a side surface wall of the housing. As a result, stiffness of the housing is ensured, and positional accuracy improved.

In still a further embodiment, the motor is a brushless motor, and a magnetically sensitive element is provided on the control circuit use board so as to face an end surface of a rotor magnet of the motor through a hole formed in the intermediate wall. Accordingly, hardly any cutting debris is generated from the motor by rotation thereof, and it is possible to maintain the space on the drive mechanism portion side in a clean state.

Details of one or more embodiments are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

An actuator 1 includes: an oblong box-shaped housing 10 which is flat in the up-down direction and which is slightly longer toward the front and back; and necessary components and elements that are disposed therein.

Figure 1:
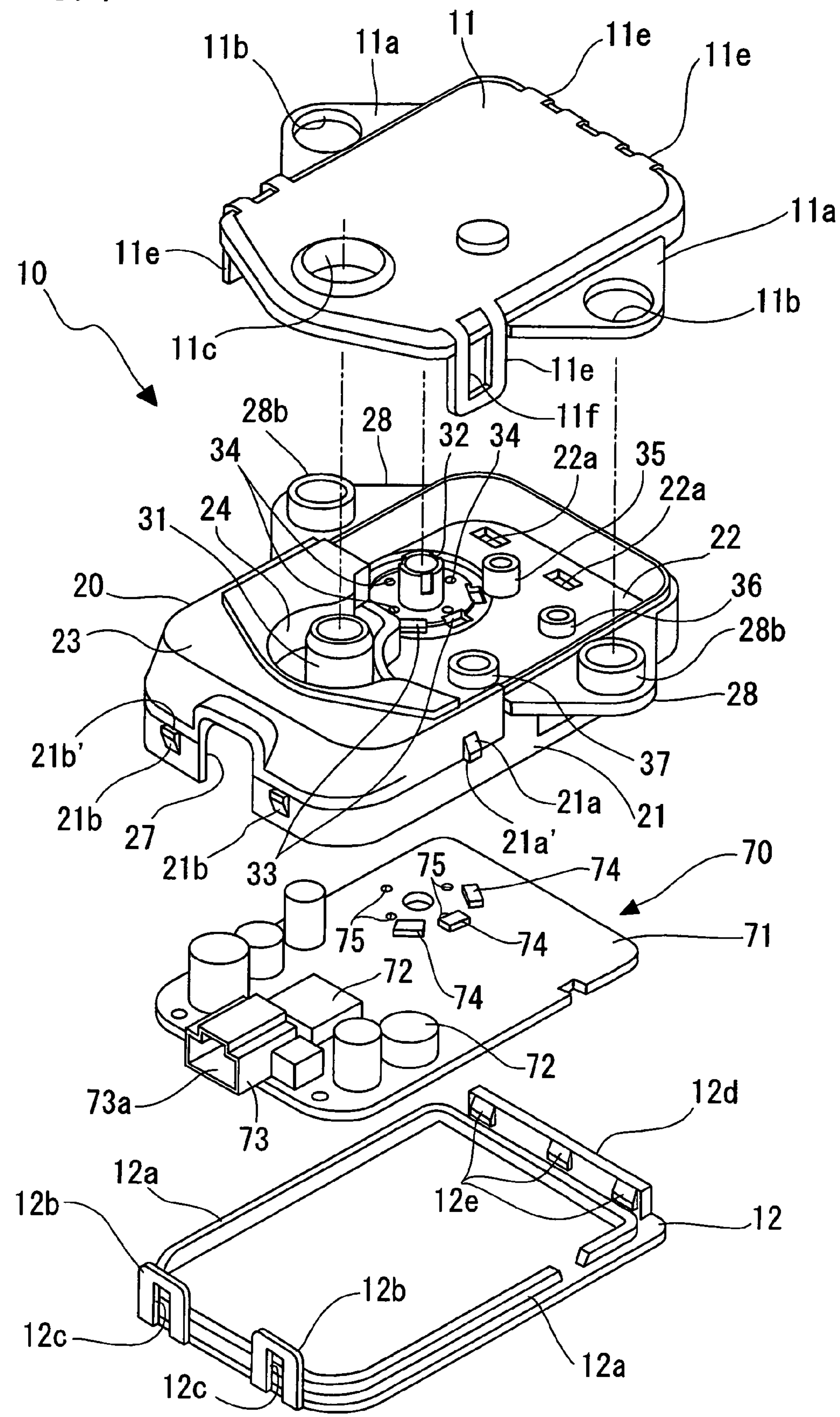
FIG. 1, is an exploded perspective view of an embodiment of the invention showing a housing and a control circuit portion.

As is apparent from FIG. 1, the housing 10 is formed from three portions, namely, a middle case 20, an upper cover 11, and a lower cover 12. These three portions 20, 11, and 12 are formed as synthetic resin molded components.

The middle case 20 includes a side surface wall 21 with some degree of up-down breadth. The inside area of the side wall surface 21, excluding a front end portion thereof, is divided in the up-down direction by an intermediate wall 22 having a peripheral edge that directly abuts with the internal surface of the side surface wall 21. If the intermediate wall 22 and the side surface wall 21 are viewed in cross section (refer to FIG. 5), they form an H-shape. Accordingly, the strength of the middle case 20, and by corollary, that of the housing 10, is increased. The front end portion of the side surface wall 21 is covered by a top surface wall 23. A dividing wall 24 is formed between a rear edge of this top surface wall 23 and a front edge of the intermediate wall 22 (refer to FIG. 4). With this configuration, the intermediate case 20 is formed to include: a drive mechanism portion housing space 25 which opens to the top and which is surrounded by the side surface wall 21, the intermediate wall 22, and the dividing wall 24; and a control circuit portion housing space 26 which opens to the bottom and which is surrounded by the side surface wall 21, the intermediate wall 22, and the top surface wall 23 and the dividing wall. Moreover, the up-down direction thickness of the two spaces 25 and 26 in the portion where the intermediate wall 22 is positioned is formed to be substantially larger for the drive mechanism portion housing space 25 than for the control circuit portion housing space 26 (refer to FIG. 4 and FIG. 5).

An opening 27 is formed in a central portion in the left-right direction of the front end portion of the side surface wall 21 of the intermediate case 20.

Fixing strips 28, 28 are provided so as to protrude to the sides from positions that are slightly to the rear side of an upper edge of the side surface wall 21 of the intermediate case 20. Insertion holes 28*a*, 28*a* are formed in the fixing strips 28, 28. Moreover, tube-shaped cylindrical portions 28*b*, 28*b* are provided so as to protrude upwards from the periphery of the insertion holes 28*a*, 28*a*.

Figure 4:
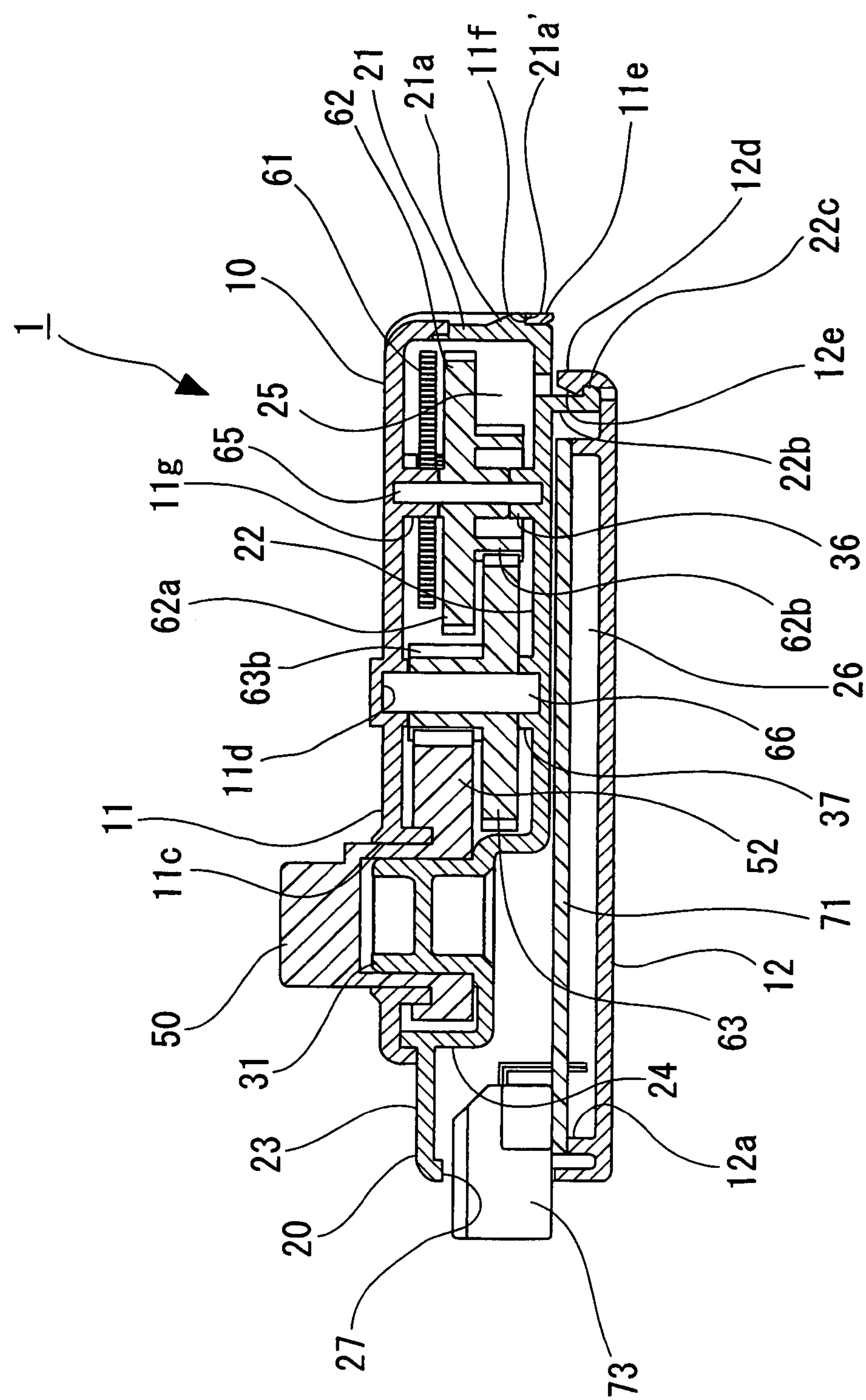
FIG. 4 is a cross section view along line IV-IV of FIG. 3.

Engaging projections 21*a*, 21*a*, . . . , and 21*b*, 21*b* are formed so as to protrude from an external side surface of the side surface wall 21 of the intermediate case 20. The engaging projections 21*a*, 21*a*, . . . are formed in four locations that are: at portions that are slightly to the front side in a front-back direction from the middle of left and right side surfaces; and at portions that are toward the left and right sides of a rear surface. Engaging surfaces 21*a*', 21*a*', . . . that face downwards are respectively provided on the engaging projections 21*a*, 21*a*, . . . The engaging projections 21*b*, 21*b* are formed at two locations on a front surface so as to be on either side of the opening 27 that is interposed therebetween. Engaging surfaces 21*b*', 21*b*' that face upwards are respectively provided on the engaging projections 21*b*, 21*b*. Three notch holes 22*a*, 22*a*, 22*a* are formed in a line in a rear end portion of the intermediate wall 22 at substantially equal distances of separation apart in a left-right direction. Engaging strips 22*b*, 22*b*, 22*b* (FIG. 4 shows just one of them) are provided so as to protrude downwards from points of the lower surface of the intermediate wall 22 that abut with the front side edge of the notch holes 22*a*, 22*a*, 22*a*. Engaging hooks 22*c*, 22*c*, 22*c* are formed at a rear surface of a lower end portion of the engaging strips 22*b*, 22*b*, 22*b*.

The upper cover 11 has a flat plate-shape and a size that entirely covers the upper surface of the drive mechanism portion housing space 25 formed in the intermediate case 20. Fixing strips 11*a*, 11*a* are formed so as to protrude to the sides from positions of the upper cover 11 that are slightly to the rear from the center in the front-back direction. Insertion holes 11*b*, 11*b* are formed in the fixing strips 11*a*, 11*a*. Further, a shaft insertion hole 11*c* is formed in a substantially central portion in a left-right direction of a front end portion of the upper cover 11, and a shaft support hole 11*d* (refer to FIG. 4) is formed at a point of the internal surface that is a distance away from the shaft insertion hole 11*c* to the rear-left. In addition, engagement strips 11*e*, 11*e*, . . . , are formed to protrude downwards from four points that are at the left and right side edges of the front end portion of the top cover 11, and at the left and right side ends of the rear edge thereof. Engagement holes 11*f*, 11*f*, . . . , that extend in the up-down direction are formed in the engagement strips 11*e*, 11*e*, . . .

The lower cover 12 has a flat plate-shape and covers the area of lower surface of the intermediate case 20, with the exception of a rear end portion thereof. A low-height internal wall 12*a* is formed at a position slightly to the inside from the external edge of the lower cover 12. Engaging strips 12*b*, 12*b* are formed so as to protrude upwards from points that are to the left and right ends of the front edge of the lower cover 12. Engagement holes 12*c*, 12*c* that extend in the up-down direction are formed in the engagement strips 12*b*, 12*b*. Moreover, an engaging wall 12*d* that extends to the left and right is formed at the rear end of the lower cover 12. Three engaging hooks 12*e*, 12*e*, 12*e* protrude from positions close to an upper edge of a front surface of the engaging wall 12*d* and are a distance apart from each other in the left-right direction.

Assembly of the housing 10 is carried out in the manner described below by covering the upper and lower sides of the intermediate case 20 with the upper cover 11 and the lower cover 12.

The upper cover 11 is positioned so as to cover the drive mechanism portion housing space 25 of the intermediate case 20, and then the lower edges of the engagement holes 11*f*, 11*f*, . . . of the engagement strips 11*e*, 11*e*, . . . are engaged with the downward facing engaging faces 21*a*', 21*a*', . . . of the engaging projections 21*a*, 21*a*, . . . formed in the external surface of the side surface wall 21 of the intermediate case 20. Accordingly, the upper cover 11 is fitted to the intermediate case 20 so as to cover the upper surface of the drive mechanism portion housing space 25. Note that, the cylindrical portions 28*b*, 28*b* formed on the fixing strips 28, 28 of the intermediate case 20 are inserted from below into the insertion holes 11*b*, 11*b* formed in the fixing strips 11*a*, 11*a* of the upper cover 11.

The lower cover 12 is positioned so as to cover the area of the lower surface of the intermediate case 20, excluding the rear end portion thereof, and, at the same time, the upper edge of the engagement holes 12*c*, 12*c* of the engagement strips 12*b*, 12*b* are engaged with the upward facing engaging surfaces 21*b*', 21*b*' of the engaging projections 21*b*, 21*b* formed in the external surface of the side surface wall 21 of the intermediate case 20. Moreover, the engaging hooks 12*e*,

12*e*, 12*e* formed on the engaging wall 12*d* of the rear end of the lower cover 12 are engaged with the engaging hooks 22*c*, 22*c*, 22*c* of the engaging strips 22*b*, 22*b*, 22*b* provided on the intermediate wall 22 of the intermediate case 20. As a result, the lower cover 12 is fitted to the intermediate case 20 so as to cover the lower surface of the control circuit portion housing space 26.

Thus, the housing 10 is formed by fitting the upper cover 11 and the lower cover 12 to the intermediate case 20 as described above so as to cover the upper and lower surfaces of the intermediate case 20.

The drive mechanism portion 30 is configured within the drive mechanism portion housing space 25 of the housing 10. As is apparent from FIG. 2, a portion that supports the various components and elements that configure the drive mechanism portion 30 is formed by the intermediate wall 22.

A shaft support tube 31 acting as a support shaft for an output shaft, described hereinafter, protrudes upwards from the intermediate wall 22 at a portion corresponding to the front end portion of the drive mechanism portion housing space 25. A support tube 32 protrudes upwards from the intermediate wall 22 at a point slightly to the rear right side of the center thereof. Facing holes 33, 33, 33 are formed at distances apart around a circumference centered on the support tube 32 of the intermediate wall 22. Further, a plurality of insertion holes 34, 34, . . . are formed around a circumference that is positioned slightly to the inside of the circumference at which the facing holes 33, 33, 33 are located. In addition, three support bosses 35, 36, 37 protrude upwards from the intermediate wall 22.

The drive mechanism portion 30 includes a motor 40, an output shaft 50, and a transmission gear system 60 for transmitting rotation from the motor 40 to the output shaft 50.

Figure 2:
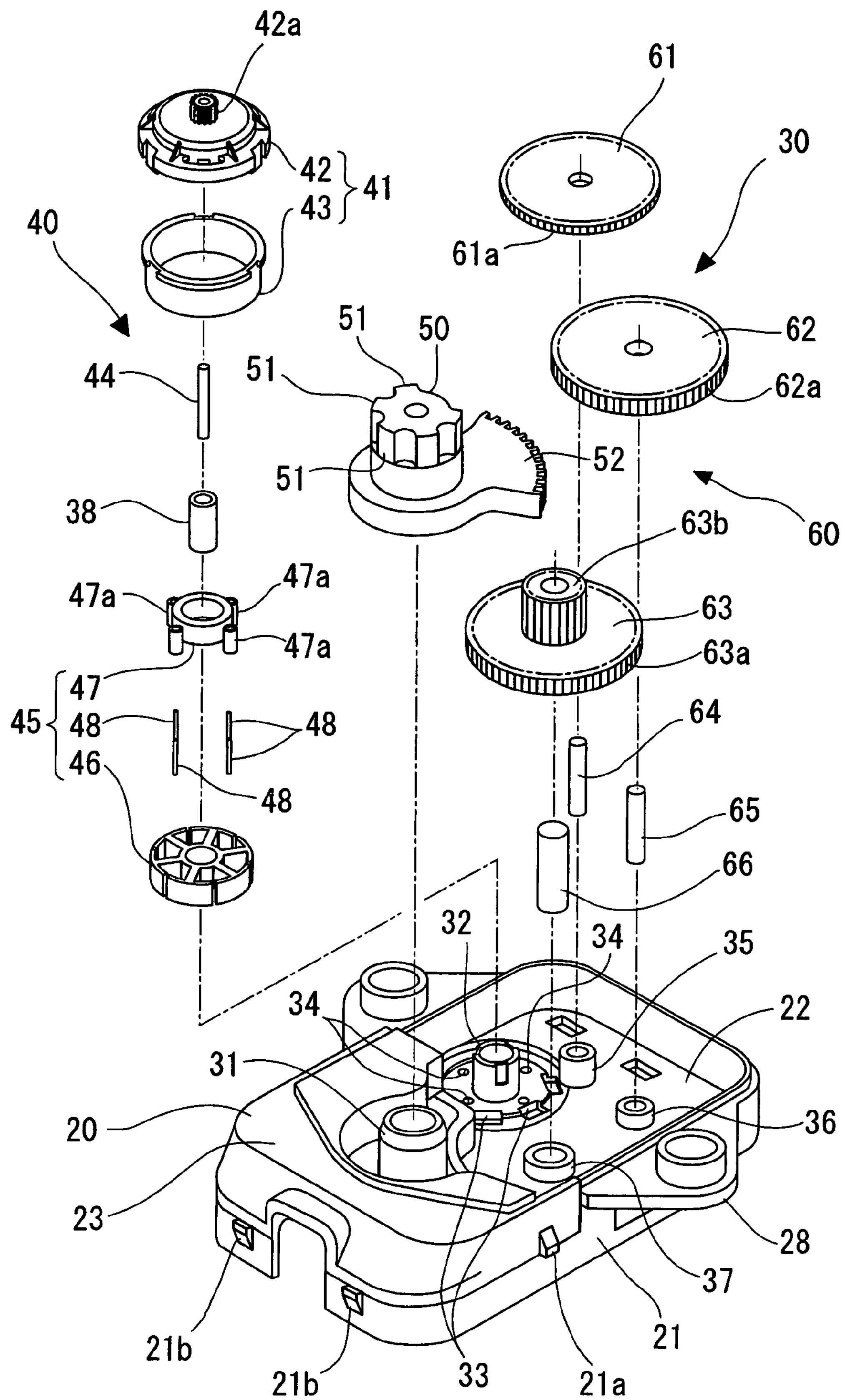
FIG. 2 is an exploded perspective view of a drive mechanism portion.
Figure 3:
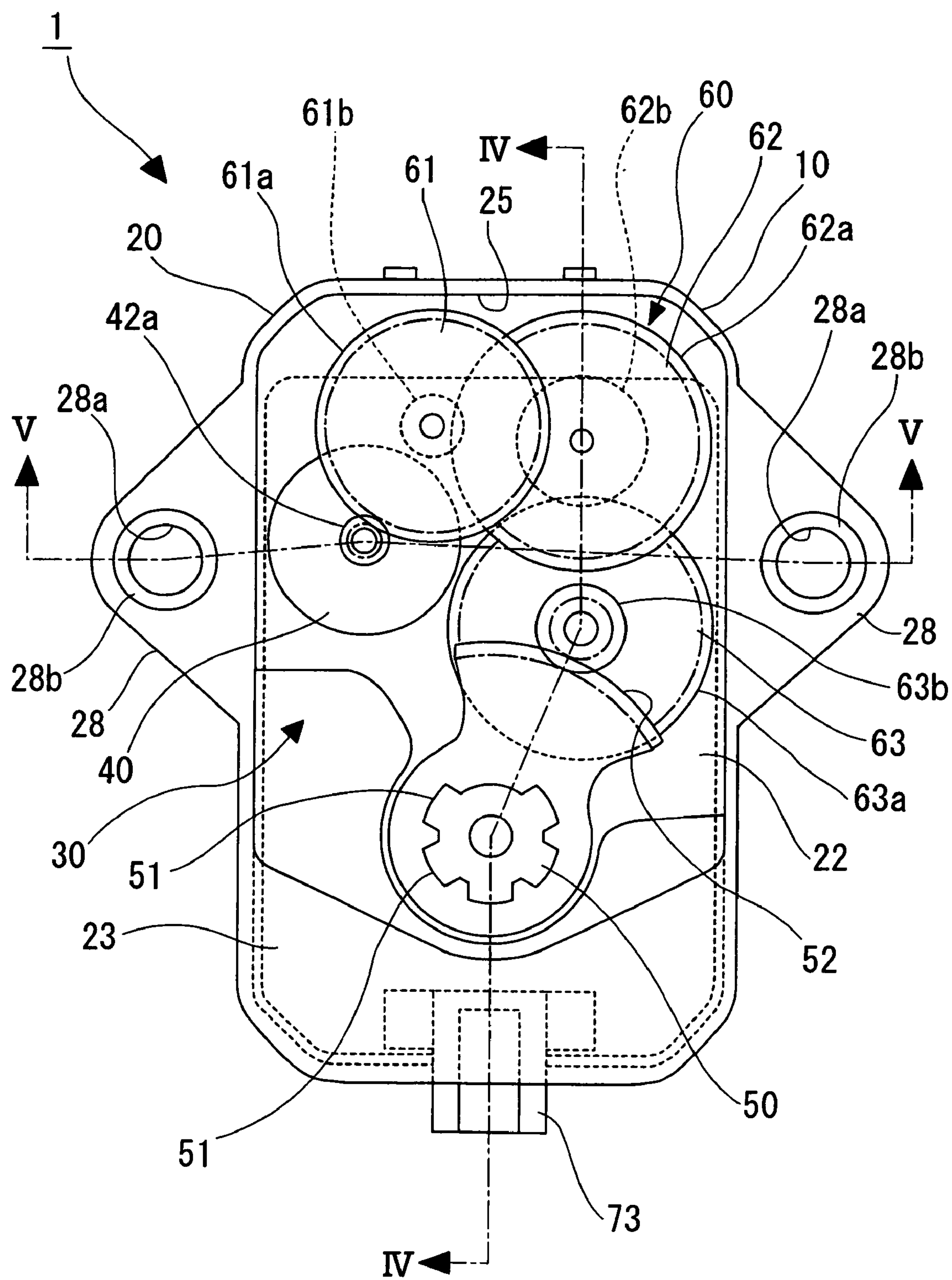
FIG. 3 is a plan view showing a state in which an upper cover is removed.
Figure 5:
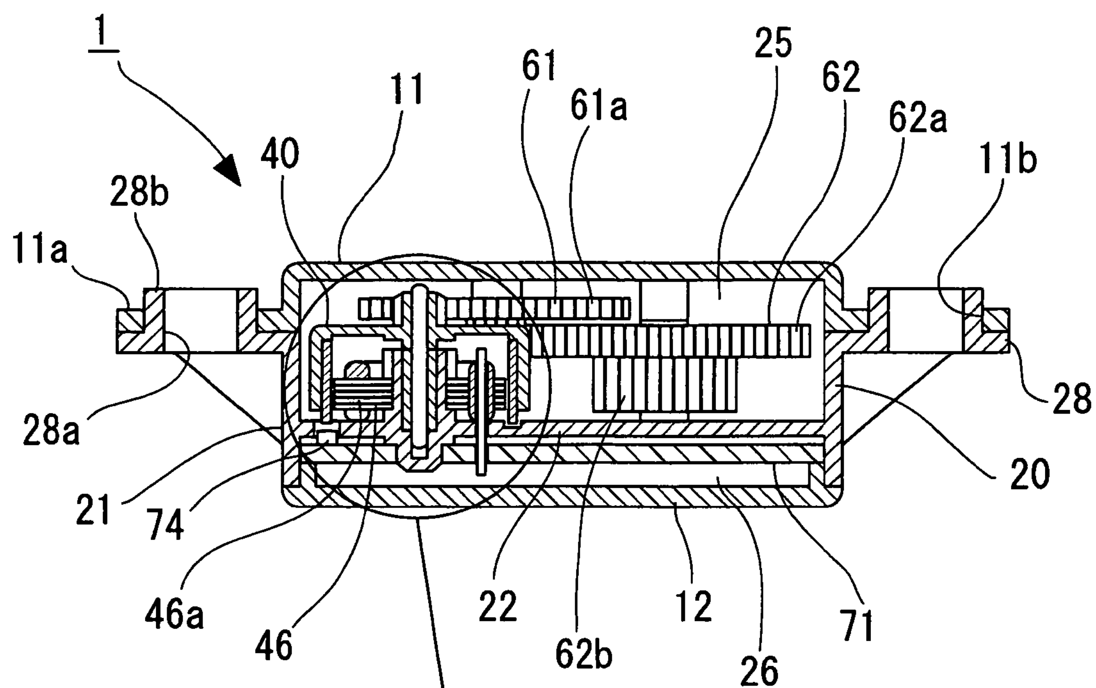
FIG. 5 is a cross section view along line V-V of FIG. 3.
Figure 5:
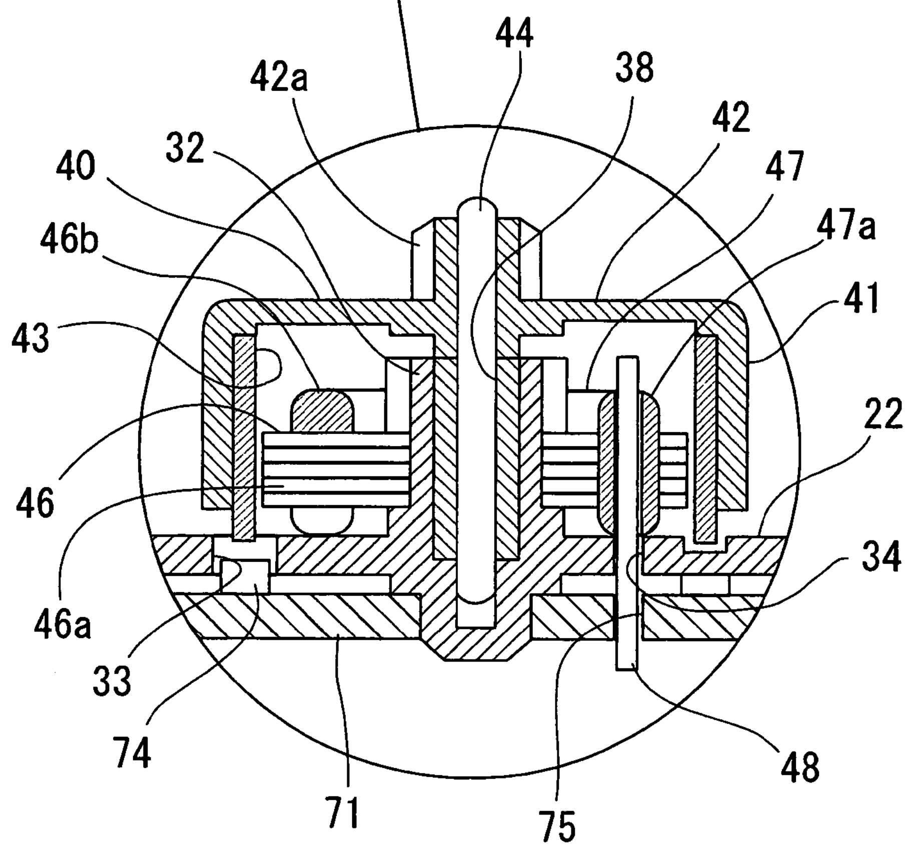

As can be seen from FIG. 2 and FIG. 5, the motor 40 includes a rotor 41. The rotor 41 is formed from a rotor member 42, a rotor magnet 43, and a rotating shaft 44. A top end portion of the rotor magnet 43, which is formed in a tubular shape, is engaged with the rotor member 42 formed from an insulating material. A top end portion of the rotating shaft 44 is fixed by press fitting to a central portion of the rotor member 42. Further, the rotating shaft 44 is rotatably supported by a shaft bearing bushing 38 that is fixed by press fitting within the support tube 32 formed integrally with the intermediate wall 22 of the housing 10. Accordingly, the rotor 41 is rotatably supported by the support tube 32 via the rotating shaft 44. Note that, the rotor magnet 43 is divided into equal portions, for example, eight portions, in the circumferential direction, with the respective portions being alternately magnetized with North and South poles. Further, the lower end of the rotor magnet 43 is placed in a position where it faces the facing holes 33, 33, 33 formed in the intermediate wall 22. In addition, a pinion gear 42*a* protrudes upwards from the center of the rotor member 42.

The motor 40 is provided with a stator 45 that faces the rotor 41. Further, the stator 45 is formed from a stator coil 46, a core base 47, and lead pins 48, 48, . . . The stator coil 46 includes a core 46*a* formed from magnetic material and coil windings 46*b* that are wound therearound. The core base 47 is formed from insulating material in a generally ring-like shape, and has lead support portions 47*a*, 47*a*, . . . , which extend in upward and downward directions from an external periphery portion thereof. The core base 47 is fixed to the intermediate wall 22 such that it surrounds the periphery of the support tube 32 that stands on the intermediate wall 22. At this time, respective lower ends of the lead support portions 47*a*, 47*a*, . . . . are placed in a position where they face insertion holes 34, 34, . . . formed in an intermediate wall 22. Further, the stator coil 46 is supported by the intermediate wall 22 via the core base 47. The lead pins 48, 48, . . . are inserted into the lead support portions 47*a*, 47*a*, . . . , and, in addition, respective lower end portions thereof that protrude from the lower end of the lead support portions 47*a*, 47*a*, . . . of the core base 47 pass through the insertion holes 34, 34, . . . of the intermediate wall 22 and protrude into the control circuit portion housing space 26 (refer to FIG. 5). Furthermore, top end portions of the lead pins 48, 48, . . . that protrude from the upper lead support portions 47*a*, 47*a*, . . . are connected to a predetermined end portion of the coil windings 46*b*.

The output shaft 50 is formed in a tube-shape with a closed top end. A plurality of engagement ridges 51, 51, . . . which extend in the axial direction and which are separate from each other in the circumferential direction are formed on an external surface of an upper end portion of the output shaft 50. Further, a lower end portion of the output shaft 50 is formed integrally with a base end portion (main base portion) of a sector gear 52. In addition, the output shaft 50 is rotatably mounted around the outside of the shaft support tube 31 protruding from the intermediate wall 22 (refer to FIG. 4). Note that, the portion on which the engagement ridges 51, 51, . . . of the output shaft 50 are formed passes through the shaft insertion hole 11*c* of the upper cover 11 and protrudes upwards from the upper cover 11.

The transmission gear system 60 is configured from three transmission gears 61, 62, 63. The transmission gear 61 includes a large gear 61*a* that is formed integrally and coaxially with a small gear 61*b* positioned to the lower side of the large gear 61*a*. The transmission gear 62 includes a large gear 62*a* that is formed integrally and coaxially with a small gear 62*b* positioned to the lower side of the large gear 62*a*. The transmission gear 63 includes a large gear 63*a* that is formed integrally and coaxially with a small gear 63*b* positioned to the upper side of the large gear 63*a*. Further, the transmission gears 61, 62, 63 are rotatably supported by respective support shafts 64, 65, 66. The support shaft 64 has a lower end portion supported by the support boss 35 formed in the intermediate wall 22, and an upper end portion supported by a support boss, not shown, that protrudes from the lower surface of the upper cover 11. Moreover, the support shaft 65 has a lower end portion supported by the support boss 36 formed in the intermediate wall 22, and an upper end portion supported by a support boss 11*g* (refer to FIG. 4) that protrudes from the lower surface of the upper cover 11. Further, the support shaft 66 has a lower end portion supported by the support boss 37 formed in the intermediate wall 22, and an upper end portion supported by the shaft support hole 11*d* formed in the lower surface of the upper cover 11.

Note that, the large gear 61*a* of the transmission gear 61 of the transmission gear system 60 is meshed with the pinion gear 42*a* of the motor 40, and the small gear 61*b* of the transmission gear 61 is meshed with the large gear 62*a* of the transmission gear 62. Further, the small gear 62*b* of the transmission gear 62 is meshed with the large gear 63*a* of the transmission gear 63, and the small gear 63*b* of the transmission gear 63 is meshed with the sector gear 52 formed integrally with the output shaft 50. Accordingly, when the motor 40 is driven, the rotation thereof is transmitted to the sector gear 52 from the pinion gear 42*a* via the transmission gear system 60. Thus, the output shaft 50 that is integrated with the sector gear 52 is rotated.

A control circuit portion 70 is disposed in the control circuit portion housing space 26 formed in the lower area of the housing 10. The control circuit portion 70 includes a control circuit use board 71 on which various electronic components and electronic elements 72, 72, . . . etc. are mounted. A connector 73 is provided at a left-right direction center portion of a top surface of a front end portion of the board 71 such that an insertion port 73*a* thereof faces in the forward direction. The connector 73 is positioned so as to face forwards from a connector use opening 27 that is formed in the housing. Further, Hall elements 74, 74, 74 for circuit control of the motor 40 are mounted on the board 71 so as to face the lower end surface of the rotor magnet 43 of the motor 40 via the facing holes 33, 33, 33 formed in the intermediate wall 22. Note that, the Hall elements 74, 74, 74 are elements that detect change of the magnetic poles that accompanies rotation of the rotor 41. Accordingly, any other magnetically sensitive element may be used instead of the Hall elements 74, 74, 74. The lower end portions of the lead pins 48, 48, . . . of the motor 40 that protrude into the control circuit portion housing space 26 pass through insertion holes 75, 75, . . . (only one is shown in FIG. 5) formed in the board 71 and are soldered to a connection pad, not shown.

In the above-configured actuator 1, the intermediate wall 22 separates the control circuit portion housing space 26 from the drive mechanism portion housing space 25 that accommodates the drive mechanism portion 30 that uses grease and oil to reduce wear of various utilized components and elements and to facilitate smooth operation. Accordingly, the grease and oil used in the drive mechanism portion 30 is inhibited from penetrating into the control circuit portion housing space 26 by the intermediate wall 22. As a result, grease and oil does not adhere to the electronic components and the elements 72, 72, . . . etc. on the board 71 of the control circuit portion 70, and thus performance deterioration of the electronic components and the elements 72, 72, . . . etc. is not caused. Further, cutting debris generated during cutting of the cut surfaces of the board 71 of the control circuit portion 70 may adhere thereon, and, on some occasions, this cutting debris is not adequately cleaned away. Cutting debris of this type is also inhibited from moving to the drive mechanism portion housing space 25 by the intermediate wall 22. Accordingly, the cutting debris does not get jammed in the gears 61, 62, 63, etc. of the drive mechanism portion 30, and thus performance deterioration of these structural elements does not occur.

Moreover, the intermediate wall 22 separates the two housing spaces 25 and 26 in the thickness direction of the board 71 of the control circuit portion 70. Thus, as compared to a case in which the two spaces are separated in the surface direction of the board 71, it is possible to reduce the size of the actuator 1 in the horizontal plane.

Moreover, the shaft support tube 31 rotatably supporting the output shaft 50 and the support tube 32 for supporting the rotating shaft 44 of the motor 40 are integrally formed with the intermediate wall 22. Accordingly, there is no need to provide special members for supporting the output shaft 50 and the rotating shaft 44, whereby it is possible to reduce part numbers, in order to reduce cost and improve production efficiency. Note that, although the support shafts 64, 65, 66 are provided as separate members for supporting the respective transmission gears 61, 62, 63, the members for supporting each of these transmission gears 61, 62, 63 may be formed integrally with the intermediate wall 22.

Moreover, the intermediate wall 22 and the side surface wall 21 are integrally formed in a substantially H-shaped cross section. Accordingly, the portion configured by the intermediate wall 22 and the side surface wall 21 has high stiffness, and it is possible to improve the positional accuracy of the elements that are integrally formed therewith. More specifically, this portion supports each element that configures the drive mechanism portion 30. Thus, the positional accuracy of the shaft support tube 31, the support tube 32, and the support bosses 35, 36, 37 is improved, whereby good meshing of the various gears is maintained and smooth rotation is ensured. In addition, positional accuracy of the facing holes 33, 33, 33 and the insertion holes 34, 34, . . . is improved, which facilitates precise assembly of the motor 40.

Further, the motor 40 is a brushless motor, and the Hall elements 74, 74, 74 provided on the board 71 of the control circuit portion face the lower end surface of the rotor magnet 43 of the motor 40 through the facing holes 33, 33, 33 formed in the intermediate wall 22. Accordingly, hardly any cutting debris is generated from the motor 40 by rotation thereof, and it is possible to maintain the drive mechanism portion housing space 25 in a clean state.

Figure 6:
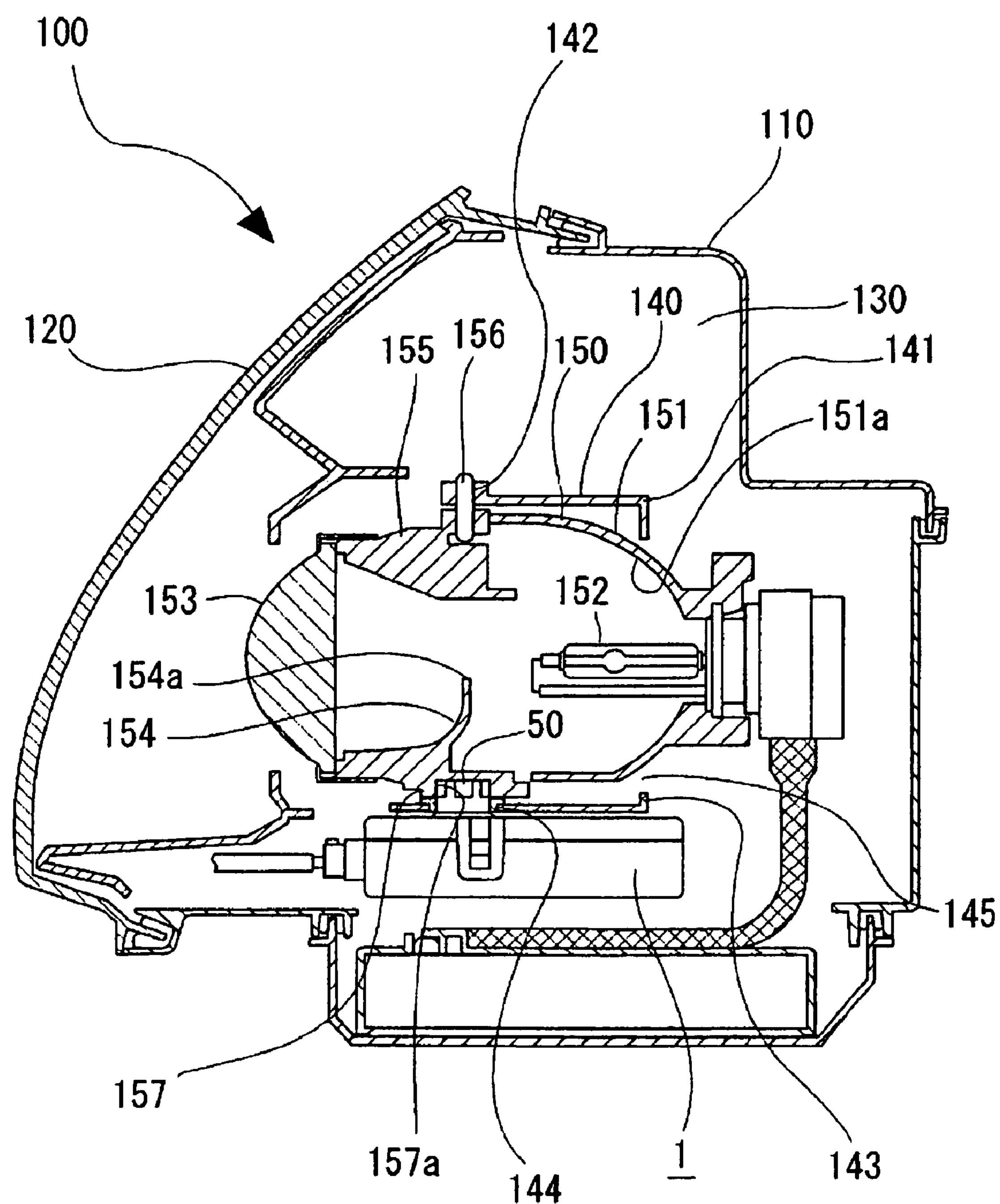
FIG. 6 is a vertical section view of an automobile headlamp illustrating an actuator of the present invention in an automobile headlamp.

Next, FIG. 6 illustrates a usage example in which the actuator 1 according to the present invention is used in light distribution control of an automobile headlamp.

The automobile headlamp 100 includes a lamp body 110 with a recess portion that opens to the front. The front opening of the lamp body 110 is covered by a transparent cover 120 to form a lamp chamber 130. A bracket 140 is disposed within the lamp chamber 130 and is swivelably supported with respect to the lamp body 110. A lamp unit 150 is supported by the bracket 140 and can be swiveled in the horizontal direction.

The lamp unit 150 includes: a projection lens 153 disposed so as to cover, from the front, reflectors 151 and a light source bulb 152 supported by the reflectors 151 and 151; and a shade 154 that defines an upper edge of a radiated light pattern (distribution pattern). The reflectors 151 include reflecting surfaces 151*a* that have a light condensing effect. The projection lens 153, which is shaped as a convex lens, is supported by a tip end portion of a generally cylindrical attachment frame 155 fixed to front end portions of the reflectors 151.

Light emitted by the light source bulb 152 and reflected by the reflecting surfaces 151*a* of the reflectors 151 is condensed in the vicinity of an upper edge 154*a* of the shade 154. Moreover, the focus of the projection lens 153 is positioned in the vicinity of the upper edge 154*a* of the shade 154. As a result, a beam is radiated forward by the projection lens 153 with a light distribution pattern having an upper edge defined by the upper edge 154*a* of the shade 154.

A fulcrum shaft 156 protrudes upwards from an upper surface of a rear end portion of the attachment frame 155, and similarly, an integrated boss 157 protrudes downwards from a lower surface of the rear end portion. In addition, an interconnecting recess portion 157*a* that opens downwards is formed in the integrated boss 157. Note that, the center of the interconnecting recess portion 157*a* and the center of the fulcrum shaft 156 are positioned coaxially.

Further, the lamp unit 150 is configured such that the fulcrum shaft 156 is rotatably supported by a shaft support portion 142 provided at a front end portion of a support strip 141 of the top side of the bracket 140; and the interconnecting boss 157 is inserted to the lower side of an insertion hole 144 provided in the front end portion of a support strip 143 of the lower side of the bracket 140. Further, the rear end portion of the lamp unit 150 protrudes to the rear from a large opening 145 provided in the bracket 140.

The lamp unit 150 is swivable in the horizontal direction by the actuator 1 that is fixed to the lower surface of the support strip 143 at the lower side of the bracket 140.

The actuator 1 is supported by the bracket 140 by inserting attachment screws, not shown, through the insertion holes 28*a*, 28*a* of the fixing strips 28, 28 from the lower side thereof, and screwing them into an attachment boss, not shown, that protrudes from the lower surface of the support strip 143 of the lower side of the bracket 140. When the output shaft 50 is fitted within the interconnecting recess portion 157*a* formed in the lower surface of the lamp unit 150, the engagement ridges 51, 51, . . . engage with engagement grooves, not shown, formed in an inner periphery surface of the interconnecting recess portion 157*a*. Accordingly, slipping of the output shaft 50 and the interconnecting recess portion 157*a* in the rotation direction is prevented.

Moreover, when the motor 40 is driven, given the above described configuration, the output shaft 50 rotates, and as a result the lamp unit 100 is swiveled in the left-right direction. In the above described manner, the actuator of the present invention is used in an automobile headlamp to take into consideration reliability related to lamp unit swiveling that affects driver safety, and limitations related to light body space. This configuration is highly effective in that desired performance can be fully demonstrated and durability improved without increasing size.

Note that, the shapes and configurations of the various elements in the above described embodiment are merely illustrative examples of one way in which the present invention may be concretely embodied, and should not be interpreted as presenting any limitation on the technical scope of the present invention.

The present invention may be favorably applied to an actuator provided with a motor; and a drive mechanism portion including a transmission gear system for transmitting rotation of the motor to an output shaft; and a control circuit portion for controlling operation of the drive mechanism portion, so as to rotate the output shaft that rotates a controlled object like a lamp unit, or the like.

Other embodiments may be within the scope of the following claims.

What is claimed is:

1. An actuator comprising:

a housing that accommodates a motor;

an output shaft for rotating a lamp unit that radiates light;

a drive mechanism portion including a transmission gear system for transmitting rotation from the motor to the output shaft;

and a control circuit portion for controlling drive of the motor, wherein the drive mechanism portion and the control circuit portion are disposed in a separated state due to an intermediate wall wherein the output shaft is rotatably mounted around the outside of a shaft support tube and transmission gears of the transmission gear system are rotatably mounted around an outside of support shafts and further wherein the shaft support tube and support shafts are in the intermediate wall.

2. The actuator according to claim 1, wherein the intermediate wall is formed to divide space inside of the housing in a thickness direction of a control circuit use board, and the drive mechanism portion is disposed in one side of the divided space, and the control circuit portion is disposed in the other side of the divided space.

3. The actuator according to claim 1, wherein the support shaft tube for the output shaft and/or the support shafts for the transmission gear system are formed in the intermediate wall.

4. The actuator according to claim 1, wherein the motor is a brushless motor, and a magnetically sensitive element provided on the control circuit use board faces an end surface of a rotor magnet of the motor via a hole formed in the intermediate wall.

5. The actuator according to claim 1, wherein the support shaft tube for the output shaft and/or the support shafts for the transmission gear system are integrally formed with the intermediate wall.

* * * * *